(12) United States Patent
Zhu et al.

(10) Patent No.: US 9,344,581 B2
(45) Date of Patent: May 17, 2016

(54) VOIP CLIENT AND CALL IMPLEMENTATION METHOD FOR VOIP CLIENT, AND USER TERMINAL

(71) Applicant: ZTE CORPORATION, Shenzhen, Guangdong Province (CN)

(72) Inventors: Jianjun Zhu, Shenzhen (CN); Zhengrong Yang, Shenzhen (CN)

(73) Assignee: ZTE CORPORATION (CN)

( * ) Notice: Subject to any disclaimer, the term of this patent is extended or adjusted under 35 U.S.C. 154(b) by 54 days.

(21) Appl. No.: 14/398,554

(22) PCT Filed: Apr. 16, 2013

(86) PCT No.: PCT/CN2013/074242
§ 371 (c)(1),
(2) Date: Nov. 3, 2014

(87) PCT Pub. No.: WO2013/163922
PCT Pub. Date: Nov. 7, 2013

(65) Prior Publication Data
US 2015/0092612 A1    Apr. 2, 2015

(30) Foreign Application Priority Data

May 2, 2012  (CN) .......................... 2012 1 0133942

(51) Int. Cl.
| | |
|---|---|
| H04W 4/00 | (2009.01) |
| H04M 15/00 | (2006.01) |
| H04L 29/06 | (2006.01) |
| H04W 4/16 | (2009.01) |
| H04L 12/14 | (2006.01) |

(52) U.S. Cl.
CPC .............. *H04M 15/56* (2013.01); *H04L 12/14* (2013.01); *H04L 65/1046* (2013.01); *H04L 65/1059* (2013.01); *H04L 65/1069* (2013.01); *H04L 65/1096* (2013.01); *H04M 15/59* (2013.01); *H04M 15/83* (2013.01); *H04W 4/16* (2013.01)

(58) Field of Classification Search
None
See application file for complete search history.

(56) References Cited

U.S. PATENT DOCUMENTS

| | | | | |
|---|---|---|---|---|
| 6,928,150 | B2 * | 8/2005 | Johnston ............... | H04M 15/00 370/495 |
| 2006/0205400 | A1 | 9/2006 | Kiyomoto | |

(Continued)

FOREIGN PATENT DOCUMENTS

| | | |
|---|---|---|
| CN | 1829265 | 9/2006 |
| CN | 102685120 | 9/2012 |

OTHER PUBLICATIONS

International Search Report for International Patent Application No. PCT/CN2013/074242, mailed Jul. 4, 2013.

*Primary Examiner* — Diane Mizrahi
(74) *Attorney, Agent, or Firm* — McAndrews, Held & Malloy, Ltd.

(57) ABSTRACT

Disclosed are a VoIP client and a call implementation method thereof, and a user terminal. The VoIP client comprises: an access module, configured to make, through a preset high-speed wireless network, the VoIP client access the Internet; a sending module, configured to send a call request to a call controller; a receiving module, configured to receive at least one called number and a rate for calling the called number that are returned by the call controller, the called number comprising: one or more numbers registered by or bound to the called party of the call request; a selection module, configured to select one from the called number as a called number of the current call according to at least one called number and the rate for calling the called number, and an execution module, configured to perform call proceeding by using the selected called number.

20 Claims, 10 Drawing Sheets

(56) References Cited

U.S. PATENT DOCUMENTS

| | | | |
|---|---|---|---|
| 2007/0121587 A1* | 5/2007 | Mundra | H04L 12/66 370/352 |
| 2008/0147741 A1* | 6/2008 | Gonen | G06Q 10/06 |
| 2016/0014186 A1* | 1/2016 | Kovalenko | H04M 3/5237 370/252 |

* cited by examiner

VOIP CLIENT AND CALL IMPLEMENTATION METHOD FOR VOIP CLIENT, AND USER TERMINAL

CROSS-REFERENCE TO RELATED APPLICATIONS/INCORPORATION BY REFERENCE

This application is a 371 of International Patent Application No. PCT/CN2013/074242, filed Apr. 16, 2013, which claims priority to Chinese Patent Application No. 201210133941.8, filed May 2, 2012, emitted "VOIP CLIENT AND CALL IMPLEMENTATION METHOD THEREOF, AND USER TERMINAL". The above-identified applications are hereby incorporated herein by reference in their entirety.

TECHNICAL FIELD

The disclosure relates to the communication field, specifically relates to a Voice over IP (VoIP) client and a call implementation method thereof, and a user terminal.

BACKGROUND

In the technology evolvement from the current to the next generation network (Next Generation Network, NGN for short), interconnection of multi-media information, such as voice, video and even a short message on a traditional telephone switched network, such as a network protocol (Internet Protocol, IP for short) packet network and a public switched telephone network (PSTN for short) may be realized through various means, such as soft switch, multimedia subsystem (IP Multimedia Core Network Subsystem, IMS for short), H.323 and session initiation protocol (SIP for short) server. The tendency of replacing time division multiplex (TDM for short) with an IP has established and has been widely applied. Comparing with a traditional circuit-based voice technology, Voice over IP (VoIP for short) is not only cheap, but voice quality also has been improved significantly with the increase of bandwidth. More importantly, various multimedia applications based on IP make VoIP have a strong appeal.

On the other hand, the progress of broadband technology changes rapidly in recent years. From the aspect of the wire aspect, the progress is from an asymmetric digital subscriber line (ADSL for short) to a video digital subscriber line (VDSL for short) and then to a passive optical network of various degrees (PON for short). From the aspect of the wireless aspect, the progress is from a general packet radio service (GPRS for short) to high-speed packet data access (HSPDA for short), to worldwide interoperability for microwave access (WiMAX for short), and to long-term evolution (LTE for short). At present, with the mature of wireless fidelity (WiFi for short) technology and the large deployment of WiFi access point (AP for short), family/enterprise/hotspot area may access the Internet free or with preferences, and enjoy a higher network speed.

Numerous Internet service providers (ISP for short) develop various soft terminals to provide customers with services of instant messaging (IM), PRESENCE and VoIP, such as MSN and Skype. Certain clients supporting social services, such as IM and PRESENCE can associate multiple user numbers of a user simultaneously, such as a mobile number and a fixed number, and when the user is called, ringing may be performed simultaneously or in a sequence so as to finish connection. However, as regards ringing in a sequence, connection time would be very long in an extreme case and influence the feeling of a calling side customer. At the same time, since a called number is not certain, cost may be different; moreover, a VoIP client at the calling side cannot learn a called number bound by a called party; therefore, the calling side user may not learn which called number (mobile or fixed number) is connected at last, thereby influencing the financial feeling of the calling side. Finally, for the operator, no matter simultaneously ringing or ringing in a sequence, a call attempt mode is adopted to perform connection, thereby occupying a large amount of call attempt resources, and the more numbers bound by the called user, the more resources occupied by the call attempt, and the more waste caused. Moreover, since the VoIP client on the calling side may not learn a called number currently bound by a called party, a calling user does not have the right of selecting a number to be finally connected.

For the problem of terrible user experience in traditional art caused by the VoIP client on the calling side failing to learn a called number currently bound by a called party, no effective solution has been proposed at present.

SUMMARY

For the problem of terrible user experience in traditional art caused by the VoIP client failing to learn a called number currently bound by a called party, the disclosure provides a VoIP client and a call implementation method thereof, and a user terminal so as to at least solve the above-mentioned problem.

According to one aspect of the disclosure, a voice over IP client is provided, comprising: an access module, configured to make, through a preset high-speed wireless network, the VoIP client access an Internet; a sending module, configured to send a call request to a call controller, a receiving module, configured to receive at least one called number and a rate for calling each of the at least one called number that are returned by a call controller, wherein the at least one called number comprising: one or more numbers registered by and/or bound to the called party corresponding to the call request; a selection module, configured to select one from the at least one called number as a called number of the current call according to the at least one called number and the rate for calling each of the at least one called number, and an execution module, configured to perform a call proceeding by using the selected called number.

Preferably, the VoIP client further comprises: a display module, configured to display the at least one called number and the rate for calling each of the at least one called number; and the selection module is further configured to take a called number selected by a user as the called number of the current call in response to a user selection from the at least one displayed called number.

Preferably, the VoIP client further comprises: a charging module, configured to calculate a real-time cost of a current conversation and a final conversation cost after the current conversation is finished according to a duration of the current conversation and a rate corresponding to the called number selected by the selection module; and the display module is further configured to display the real-time cost of the current conversation and the final conversation cost after the current conversation is finished.

Preferably, the VoIP client further comprises: a reporting module, configured to report a media stream report of the present conversation to the call controller after the current conversation with the called party is finished.

Preferably, the VoIP client further comprises: a registration module, configured to register the VoIP client to the call controller and an application server through the Internet.

Preferably, the VoIP client further comprises: a detection module, configured to detect whether there is a stable signal of the preset high-speed wireless network or not currently, and if not, then trigger a prompt module; and the prompt module, configured to give a prompt of not suggesting to run the VoIP client.

Preferably, the execution module is further configured to stop running the VoIP client in the case where the detection module detects that there is no signal of the preset high-speed wireless network currently or the access module cannot access the Internet.

Preferably, the preset high-speed wireless network comprises one of the following: wireless fidelity (WiFi), unlicensed mobile access (UMA), worldwide interoperability for microwave access (WiMAX), long term evolution (LTE), and advanced LTE.

Preferably, the receiving module is further configured to receive an activation message, which is for indicating to start the VoIP client if the VoIP is on-line and not registered; and the VoIP client further comprises: a starting module, configured to start the VoIP client when receiving the activation message, and register the VoIP client to the call controller and an application server.

Preferably, the receiving module is further configured to receive a call request from the call controller after the starting module successfully registers the VoIP client to the call controller and the application server, wherein a called party corresponding to the call request is the VoIP client.

Preferably, the activation message is sent to the VoIP client by a notification server in the case where the VoIP client serves as a called party, the call controller determines that the VoIP client is not registered and a notification is sent to the notification server.

According to another aspect of the disclosure, a user terminal is provided, comprising the above-mentioned VoIP client.

According to a further aspect of the disclosure, a call implementation method for a voice over IP client is provided, comprising: a VoIP client sending a call request to a call controller after accessing an internet through a preset high-speed wireless network; the VoIP client receive at least one called number and a rate for calling each of the at least one called number that are returned by the call controller, wherein the at least one called number comprises: one or more numbers registered by and/or bound to the called party corresponding to the call request; the VoIP client selects one from the at least one called number as a called number of the current call according to at least one called number and the rate for calling each of the at least one called number, and the VoIP client performs call proceeding by using the selected called number.

Preferably, after the VoIP client receives the rate for calling each of the at least one called number that is returned by the call controller, the method further comprises: displaying the at least one called number and the rate for calling each of the at least one called number; the VoIP client selecting one from the at least one called number as a called number of the current call according to the at least one called number and the rate for calling each of the at least one called number comprises: taking a called number selected by a user as the called number of the current call in response to a user selection from the at least one displayed called number; and the VoIP client selecting one from the at least one called number as the called number of the current call according to the at least one called number and the rate for calling each of the at least one called number.

Preferably, after the VoIP client performs the call proceeding by using the selected called number, the method further comprises: the VoIP client performing a conversation with a called party, and calculating a real-time cost of a current conversation and a final conversation cost after the current conversation is finished according to a duration of the current conversation and a rate corresponding to the called number selected by the selection module; and the VoIP client displaying the real-time cost of the current conversation and the final conversation cost after the current conversation is finished.

Preferably, after the VoIP client performs the call proceeding by using the selected called number, the method further comprises: the VoIP client performing a conversation with a called party, and reporting a media stream report of the present conversation to the call controller after the current conversation with the called party is finished.

Preferably, the method further comprises: the VoIP client detecting whether there is a stable signal of the preset high-speed wireless network or not currently, and if not, then giving a prompt of not suggesting to run the VoIP client.

Preferably, when the VoIP client detects that there is no signal of the preset high-speed wireless network currently or the VoIP client cannot access the Internet, the method further comprises: the VoIP client stopping running.

Preferably, the method further comprises: the VoIP client receiving an activation message indicating to start the VoIP client in the state where the VoIP is on-line and not registered; and the VoIP client being started when the activation message is received, and registering on the call controller and an application server.

Preferably, the activation message is sent to the VoIP client by a notification server in the case where the VoIP client serves as a called party, the call controller determines that the VoIP client is not registered and a notification is sent to the notification server.

In the disclosure, after sending a call request, the VoIP client selects a called number from a plurality of called numbers to perform a call proceeding according to one or more called numbers bound to or registered by the called party currently and rates for calling the plurality of called numbers that are returned by the call controller, the problem of terrible user experience in the traditional art caused by the VoIP client on the calling side failing to learn the plurality of called numbers currently bound to or registered by the called party is solved. Since the current called number is selected from the plurality of called numbers to perform the call proceeding without ringing in a sequence, thereby conserving the resources for the call attempt and improving the user experience.

BRIEF DESCRIPTION OF THE DRAWINGS

Drawings, provided for further understanding of the disclosure and forming a part of the specification, are used to explain the disclosure together with embodiments of the disclosure rather than to limit the disclosure, wherein.

DESCRIPTION OF EMBODIMENTS

The preferred embodiments are described in conjunction with the drawings as follows. It should be noted that the embodiments and the characteristics of the embodiments can be combined with each other if no conflict is caused.

Figure 1:
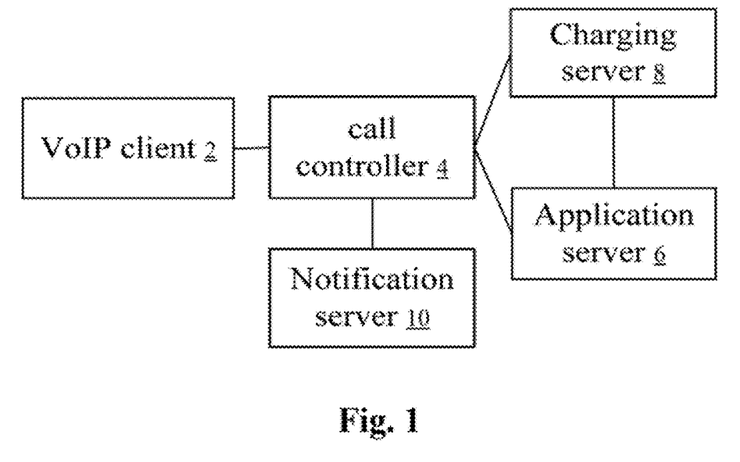
FIG. 1 is a schematic diagram of a system for implementing multimedia call according to an embodiment of the disclosure.

FIG. 1 is a schematic diagram of a system for implementing multimedia call according to an embodiment of the disclosure, and as shown in FIG. 1, the system may comprises: a VoIP client 2, a call controller 4, an application server 6, a charging server 8 and a notification server 10. The VoIP client 2 is configured to send a call request, and select a called number of a current call according to at least one called number and a rate for calling each of the at least one called number that are returned by the call controller 4, and use the selected number to perform a call proceeding, wherein the at least one called number comprises: one or more numbers registered by and/or bound to the called party corresponding to the call request; the call controller 4 is configured to receive the call request of the VoIP client 2 and acquire the at least one called number and the rate for calling each of the at least one called number from the application server 6, and send the at least one called number acquired and the rate for calling each of the at least one called number to the VoIP client 2; and after a rate option selected from rate options corresponding to each called number by the VoIP client 2 is received, the call proceeding between the VoIP client 2 and a called terminal corresponding to the called number selected by the VoIP client 2 is performed; the application server 6 is configured to return the at least one called number and the rate for calling each of the at least one called number to the call controller 4; the charging server 4 is configured to store call rate information, and in the call process, feed back relevant rate according to calling and called numbers; and the notification server 5 is configured to notify the VoIP client to start registration and perform the call proceeding in a greatest extent in the case where the VoIP client is the called party and not registered.

In an embodiment of the disclosure, a user may use a VoIP client to perform a call, and display multiple called numbers corresponding to a called party of the call and rates corresponding to the called numbers on the VoIP client before the call proceeding, and after a user selects an appropriate called number, the call proceeding is finished through a multimedia call system.

In the embodiment of the disclosure, the VoIP client may be downloaded freely from an application store (Apple Store) (for example, Android Market or other smart mobile terminal operation system).

In an embodiment of the disclosure, the VoIP client may run on a smart phone, PC machine or the user terminal of other medium. The smart phone, PC machine or other medium may download the VoIP client software from the application store, or the VoIP client program may be pre-stored in the smart phone, PC machine or corresponding storage space and memory of other medium.

The VoIP client in the embodiment of the disclosure may support WiFi or other high-speed wireless network technology (for example, unlicensed mobile access (UMA), WiMax, long term evolution (LTE), and even advanced LTE (LTE-A)), etc., and when these wireless signals exist, a user may realize real-time multimedia call services, such as voice, video and short message through these wireless or wire bearer networks.

Figure 2:
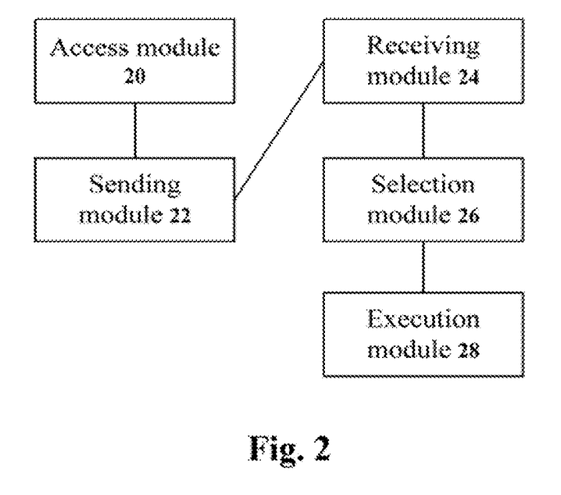
FIG. 2 is a structure diagram of a VoIP client according to an embodiment of the disclosure.

FIG. 2 is a structure diagram of a VoIP client 2 according to an embodiment of the disclosure, and as shown in FIG. 2, the VoIP client 2 in an embodiment of the disclosure mainly comprises: an access module 20, configured to make, through a preset high-speed wireless network, the VoIP client access the Internet; a sending module 22, configured to send a call request to a call controller; a receiving module 24, configured to receive at least one called number and a rate for calling each the at least one called number that are returned by the call controller, the at least one called number comprising: one or more numbers registered by and/or bound to the called party of the call request; a selection module 26 coupled to the receiving module 24, and configured to select one from the at least one called number as a called number of the current call according to the at least one called number and the rate for calling each of the at least one called number, and an execution module 28 coupled to the selection module 26 and configured to perform a call proceeding by using the selected called number.

In the embodiment of the disclosure, after the sending module 22 sends a call request, the receiving module 24 receives at least one number registered by or bound to the called party returned by the call controller and at least one rate corresponding to the at least one number, and the selection module 26 selects a called number of a current call to perform a call proceeding according to the information received by the receiving module 24. Through the VoIP client provided by the embodiment of the disclosure, there is no need to ring each number registered by or bound to the called party in a sequence, thereby saving wireless resources occupied by the call attempt and conserving the time of call attempt.

Figure 3:
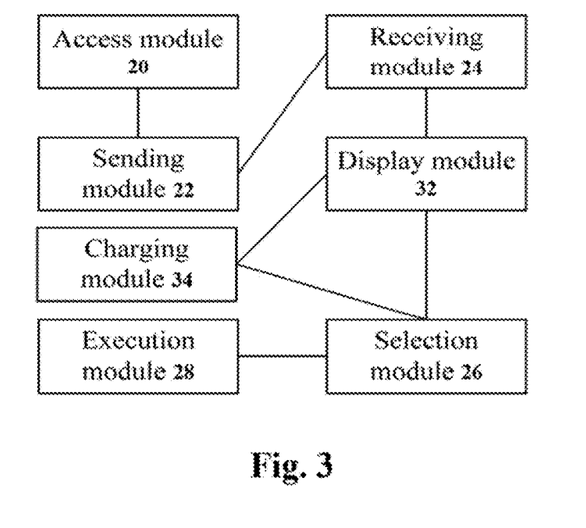
FIG. 3 is a structure diagram of a VoIP client according to a first preferred embodiment of the disclosure.

FIG. 3 is a structure diagram of a VoIP client according to a preferred embodiment of the disclosure, and as shown in FIG. 3, in the preferred embodiment, the VoIP client further comprises: a display module 32 coupled to a receiving module 24, and configured to display the at least one called number and the rate for calling each of the at least one called number. In a preferred embodiment, the selection module 26 is configured to take a called number selected by a user as the called number of the current call in response to the user selection from the at least one displayed called number. In the embodiment of the disclosure, the display module 32 displays the at least one called number and the rate for calling each of the at least one called number to the user, so that a calling user may select a called number of a current call according to the rate of each called number. Through the solution as stated above, the consumption transparency of a calling user and the user experience are improved.

In a preferred embodiment of the disclosure, in order to make a calling user to learn the real-time cost and final conversation cost of a current call process, as shown in FIG. 3, the VoIP client may further comprise: a charging module 34, configured to calculate a real-time cost of a current conversation and a final conversation cost after the current conversation is finished according to the duration of the current conversation and a rate corresponding to the called number selected by the selection module; and the display module 32 is further configured to display the real-time cost of the current conversation and the final conversation cost after the current conversation is finished. During a specific implementation, with regard to a prepayment service, after a conversation begins, a charging server will also perform charging for a current conversation according to the duration of a current conversation and a rate of a called number selected by a selection module. Since parameters used for charging by the charging server and the VoIP client are the same, both charging results are also the same.

Figure 4:
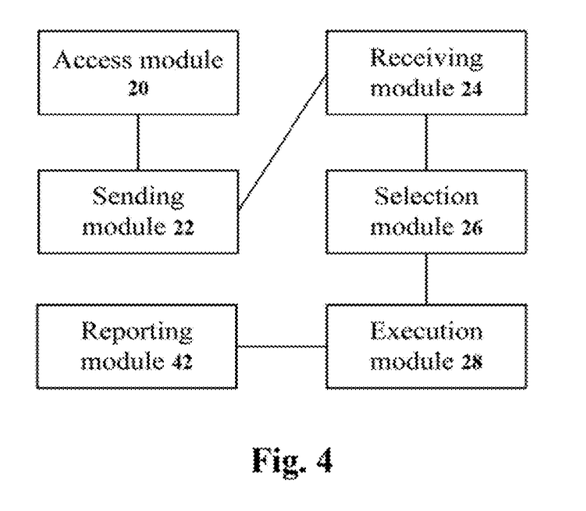
FIG. 4 is a structure diagram of a VoIP client according to a second preferred embodiment of the disclosure.

In another preferred embodiment of the disclosure, in order to make the call controller may inquire and use the data of the present conversation through analysis, as shown in FIG. 4, in the preferred embodiment, the VoIP client may further comprise: a reporting module 42, configured to report a media stream report of the present conversation to the call controller after the conversation with the called party is finished. The media stream report comprises but is not limited to the following information: a current bandwidth, delay and jitter, etc.

Figure 5:
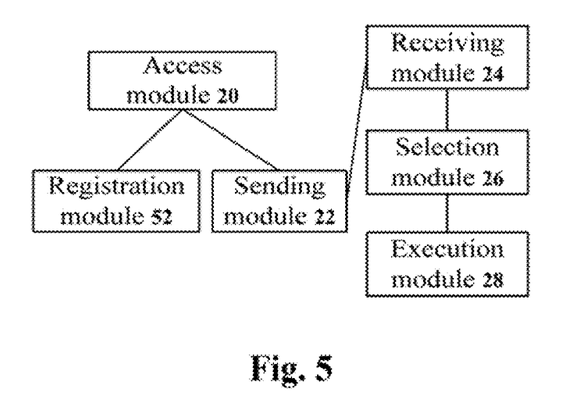
FIG. 5 is a structure diagram of a VoIP client according to a third preferred embodiment of the disclosure.

In another preferred embodiment of the disclosure, in order to enable the call controller to bind the VoIP client with a certain user, as shown in FIG. 5, the VoIP client further comprises: a registration module 52, configured to register the VoIP client to the call controller through the Internet, wherein the call controller may acquire at least one bound relevant number from an application server, and when other users dial the number corresponding to the VoIP client, the call controller would send the calling number and the number corresponding to the VoIP as well as relevant numbers to a charging server so as to obtain the rates of connecting each number.

Figure 6:
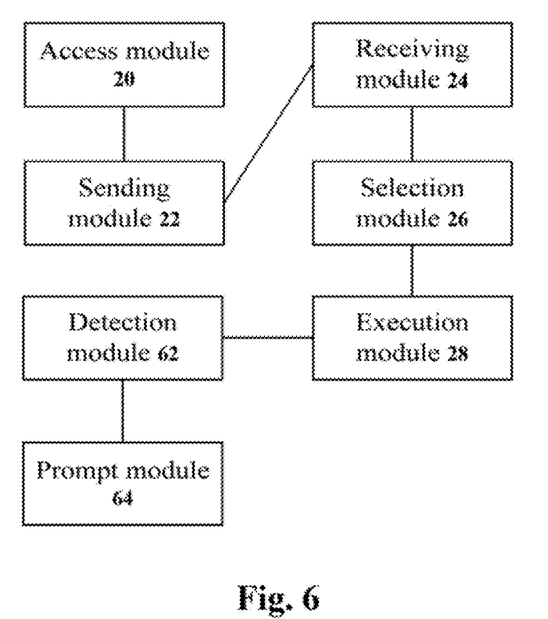
FIG. 6 is a structure diagram of a VoIP client according to a fourth preferred embodiment of the disclosure.

In another preferred embodiment of the disclosure, in order to enable a user to learn the current network situation when a current preset high-speed wireless signal is not stable, as shown in FIG. 6, the VoIP client may also comprise: a detection module, configured to detect whether there is stable signal of the preset high-speed wireless network or not currently, and if not, then trigger a prompt module 64; and the prompt module 64, configured to give a prompt of not suggesting to run the VoIP client.

In another preferred embodiment of the disclosure, the execution module 26 is further configured to stop running the VoIP client in the case where the detection module 62 detects that there is no signal of the preset high-speed wireless network currently or the access module 22 cannot access the Internet.

In the embodiments of the disclosure, the above-mentioned preset high-speed wireless network comprises but is not limited to: wireless fidelity (WiFi), unlicensed mobile access (UMA), worldwide interoperability for microwave access (WiMAX), long term evolution (LIE), and advanced LTE (LTE-A).

Figure 7:
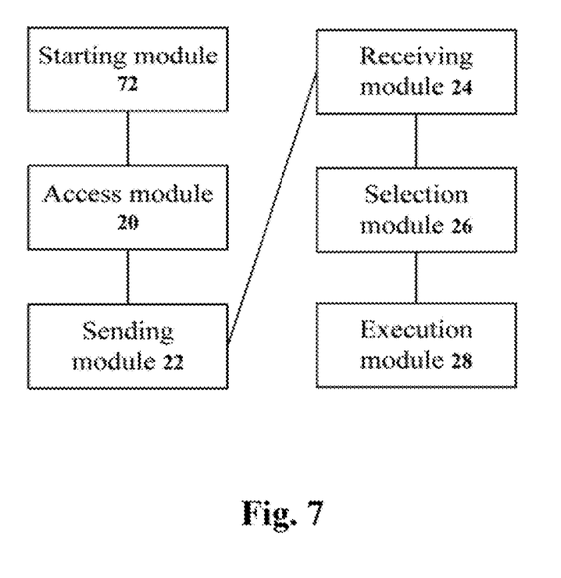
FIG. 7 is a structure diagram of a VoIP client according to a sixth preferred embodiment of the disclosure.

In an preferred embodiment of the disclosure, in order to enable the VoIP client to perform a call proceeding successfully as a called party without registration, as shown in FIG. 7, a receiving module 24 is further configured to receive an activation message indicating to start the VoIP client in the state where the VoIP is on-line and not registered; the VoIP client further comprises: a starting module 72, configured to start the VoIP client when triggering by the activation message and register the VoIP client to the call controller and application server.

In a preferred embodiment of the disclosure, the VoIP client may serve as a called party to connect a call after the registration is successful; therefore, in the preferred implementation, the receiving module 24 is further configured to receive a call request from the call controller after the starting module 72 successfully registers the VoIP client to the call controller and the application server, wherein the called party of the call request is the VoIP client.

Preferably, the above-mentioned activation message is sent to the VoIP client by a notification server in the case where the VoIP client serves as a called party, the call controller determines that the VoIP client is not registered and a notification is sent to the notification server.

According to the embodiment of the disclosure, a user terminal is also provided, wherein the user terminal may comprise the VoIP client with the combination of technical features of the above-mentioned any one embodiment or multiple embodiments. The user terminal may be a PC machine or a handheld terminal (for example, a mobile phone, a PSP, etc.).

According to the embodiment of the disclosure, a call implementation method for a VoIP client is also provided, and the method may be implemented through the VoIP client as claimed in the above-mentioned any embodiment.

Figure 8:
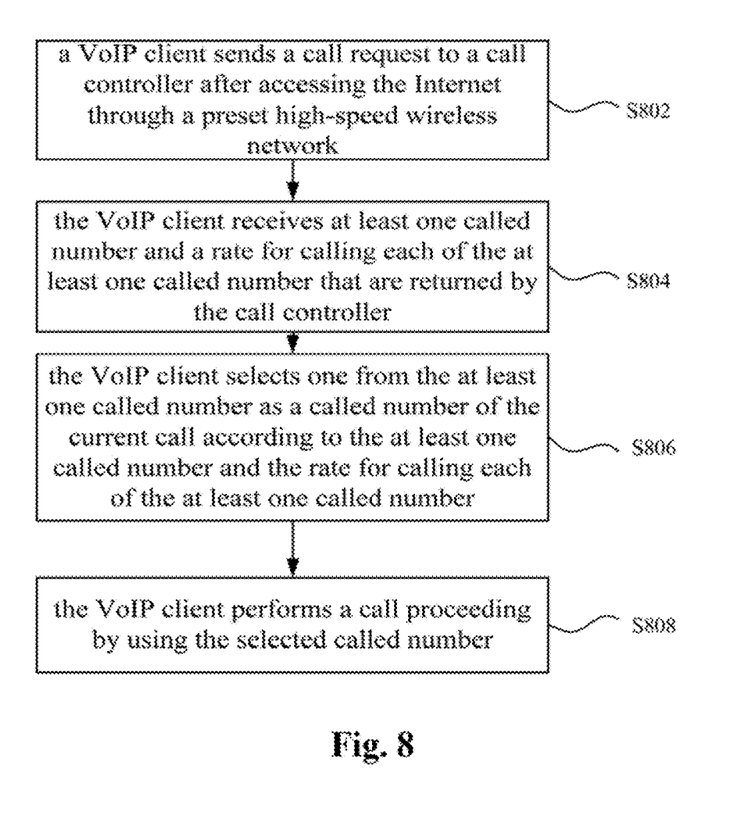
FIG. 8 is a flow chart of an implementing method for a VoIP client according to an embodiment of the disclosure.

FIG. 8 is a flow chart of an implementing method for a VoIP client according to an embodiment of the disclosure, and as shown in FIG. 8, the method mainly comprises the following steps (step S802-step S808).

Step S802, a VoIP client sends a call request to a call controller after accessing the Internet through a preset high-speed wireless network.

Step S804, the VoIP client receives at least one called number and a rate for calling each of the at least one called number that are returned by the call controller, wherein the at least one called number comprises: one or more numbers registered by and/or bound to the called party of the call request.

Step S806, the VoIP client selects one from the at least one called number as a called number of the current call according to the at least one called number and the rate for calling each of the at least one called number.

Step S808, the VoIP client performs a call proceeding by using the selected called number.

In the embodiment of the disclosure, after sending a call request, the VoIP client receives one or more numbers registered by or bound to the called party returned by the call controller and rates corresponding to the one or more numbers, and selects the called number of the current call to connect the call according to the received information, and therefore there is no need to ring each number registered by or bound to the called party in a sequence, thereby saving wireless resources occupied by the call attempt and conserving the time of call attempt.

In a preferred embodiment of the disclosure, after the VoIP client receives information returned by the call controller, the method further comprises: the VoIP client displays the at least one called number and the rate for calling each of the at least one called number. In the preferred embodiment, the VoIP client may take a called number selected by a user as the called number of the current call in response to the user selection from the at least one called number displayed. Through the preferred embodiment, the called numbers and the rates for calling the called numbers are displayed to the user, so that a calling user may select a called number of the current call according to the rates of the called numbers, and the consumption transparency of the calling user and the user experience are improved.

In a preferred embodiment of the disclosure, after the VoIP client performs the call proceeding by using the selected called number, the method may further comprise: the VoIP client performs a conversation with a called party, and calculates a real-time cost of a current conversation and a final conversation cost after the current conversation is finished according to the duration of the current conversation and a rate corresponding to the called number selected by the selection module; and the VoIP client displays the real-time cost of the current conversation and the final conversation cost after the current conversation is finished. Through the preferred embodiment, a calling user may learn real-time cost and final conversation cost in a current call process, and user experience is further improved. During a specific implementation, with regard to a prepayment service, after a conversation begins, a charging server will also perform charging for the current conversation according to the duration of the current conversation and a rate of the called number selected by the selection module. Since parameters used for charging by the charging server and the VoIP client are the same, both charging results are also the same.

In another preferred embodiment of the disclosure, after the VoIP client performs the call proceeding by using the selected called number, the method may further comprise: the VoIP client performs a conversation with a called party, and after the conversation with the called party is finished, reports a media stream report of the present conversation to the call controller. The information in the media stream report comprises but is not limited to: a current bandwidth, delay and jitter, etc. Through the preferred embodiment, the call controller may inquire and use the data of the present conversation through analysis.

In a preferred embodiment of the disclosure, the VoIP client may further detect whether there is a stable signal of the preset high-speed wireless network or not currently, and if not, then give a prompt of not suggesting to run the VoIP client. Therefore a user may learn the current network situation when a current preset high-speed wireless signal is not stable, and user experience is further improved.

In a preferred embodiment of the disclosure, when the VoIP client detects that there is no signal of the preset high-speed wireless network currently or the VoIP client cannot access the Internet, the VoIP client may stop running, so that the VoIP client executing unnecessary call or access may be avoided.

In a preferred embodiment of the disclosure, in order to enable the VoIP client to proceed the call successfully as a called party without registration, the method may further comprise: the VoIP client receives an activation message indicating to start the VoIP client in the state where the VoIP is on-line and not registered; and the VoIP client is started when triggered by the activation message and performs registration on the call controller and application server.

In a preferred embodiment of the disclosure, the VoIP client may serve as a called party to proceed the call after the registration is successful; therefore, in the preferred implementation, the VoIP client receives the call request from the call controller after successfully registering to the call controller and the application server, wherein the called party of the call request is the VoIP client.

Preferably, the above-mentioned activation message is sent to the VoIP client by a notification server in the case where the VoIP client serves as the called party, the call controller determines that the VoIP client is not registered and a notification is sent to the notification server.

Figure 9:
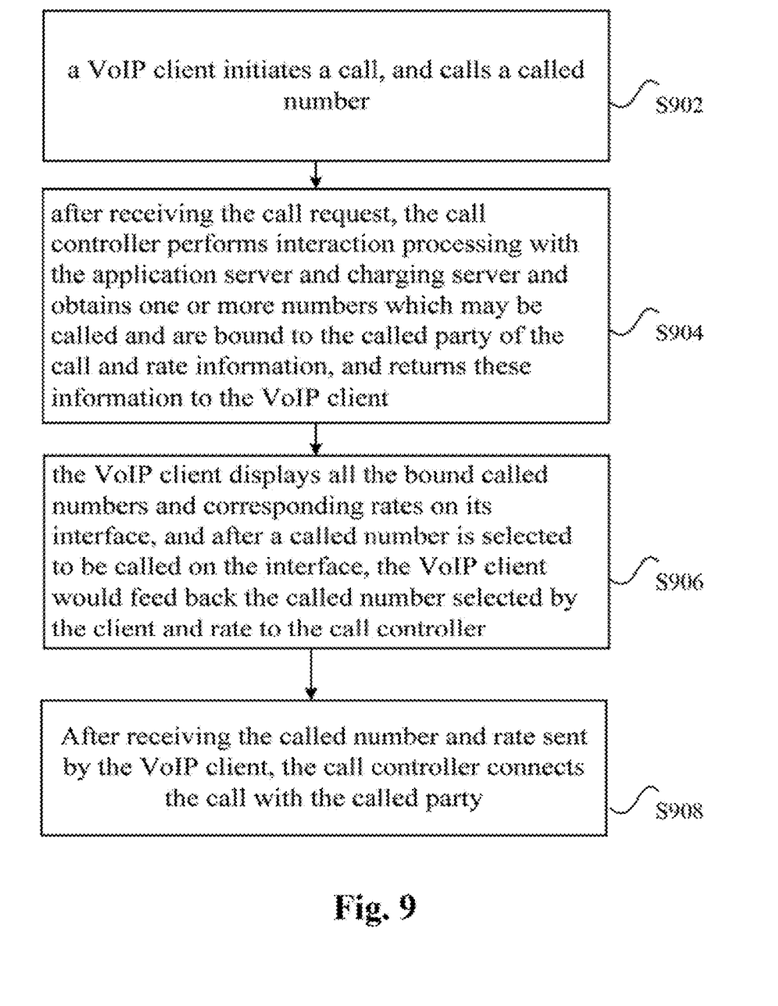
FIG. 9 is a flow chart of an implementing method for a VoIP client according to a preferred embodiment of the disclosure.

FIG. 9 is a flow chart of an implementing method for a VoIP terminal according to a preferred embodiment of the disclosure, and as shown in FIG. 9, the method comprises the following steps (step S902-step S908).

Step S902, a VoIP client initiates a call, and after receiving a call request of the VoIP client, a call controller sends the call request to an application server.

Figure 10:
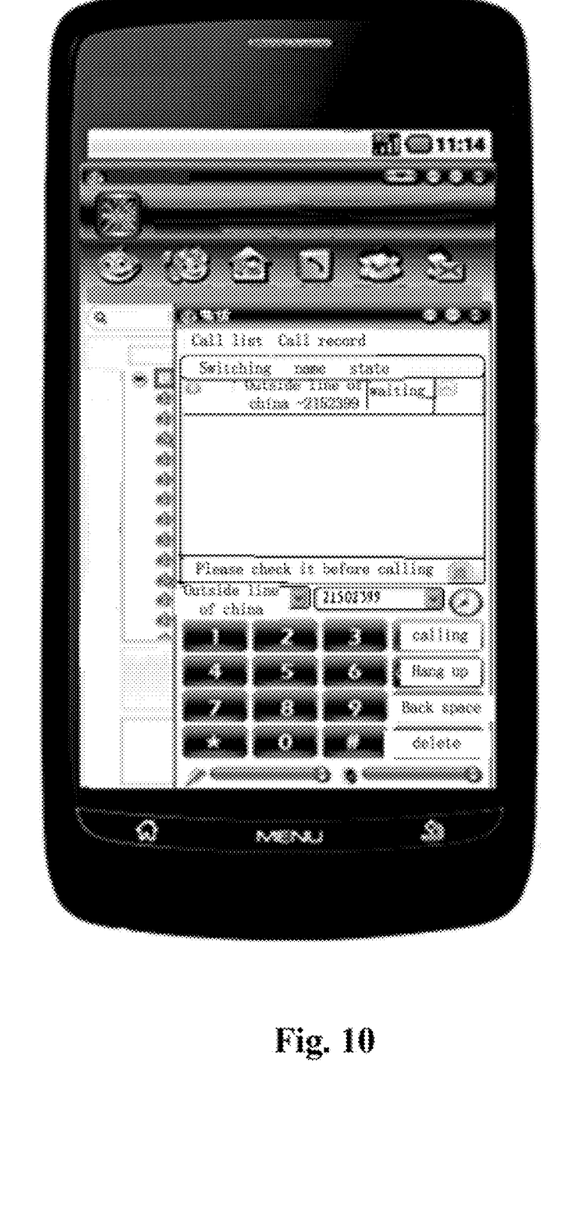
FIG. 10 is a display instantiation image when a VoIP client initiates a call in an embodiment of the disclosure.

FIG. 10 is a display instantiation image when a VoIP client sends a call request, and as shown in FIG. 10, the VoIP client may send a call request through a call key.

Step S904, after receiving the call request, the call controller performs interaction processing with the application server and charging server and obtains one or more numbers which may be called and are bound to the called party of the call and rate information, and returns these information to the VoIP client. At the same time, the call controller temporarily suspends the call request.

Step S906, the VoIP client displays all the bound called numbers and corresponding rates on its interface, and after a called number is selected to be called on the interface, the VoIP client would feed back the called number selected by the client and rate to the call controller.

Figure 11:
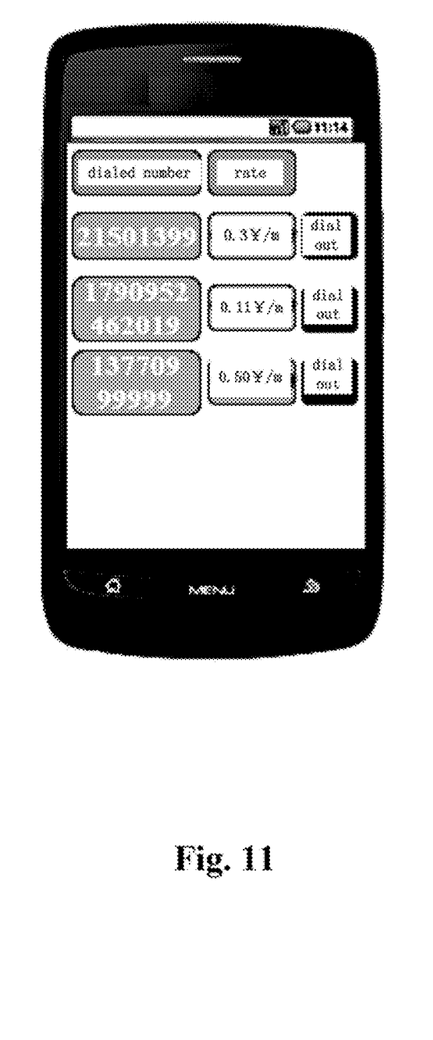
FIG. 11 is a display instantiation image when a VoIP client receives all bound called numbers and corresponding rates in an embodiment of the disclosure.
Figure 12:
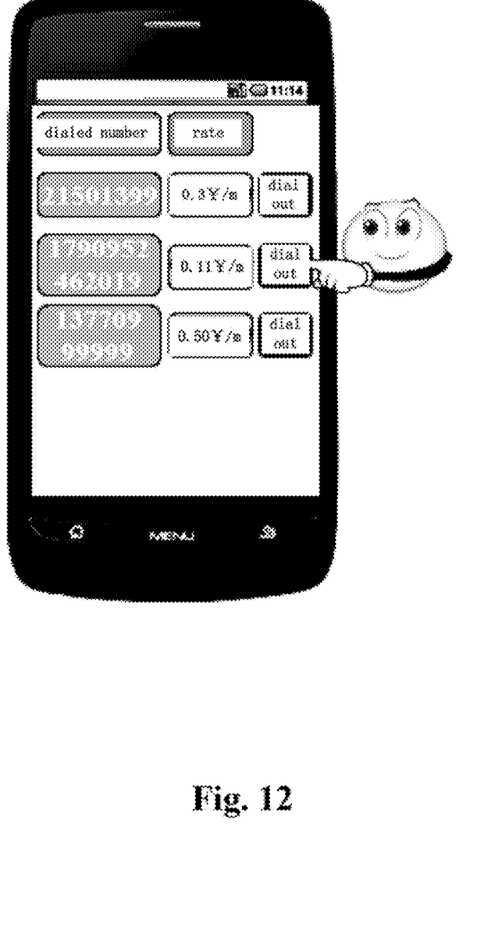
FIG. 12 is a display instantiation image of a user selecting a number to be called on an interface of the VoIP client in an embodiment of the disclosure.

FIG. 11 is a display instantiation image when a VoIP client receives all bound called numbers and corresponding rates in an embodiment of the disclosure, and as shown in FIG. 11, the VoIP client on the calling side displays all the called numbers and corresponding rates. FIG. 12 is a display instantiation image of a user selecting a number to be called on an interface of the VoIP client in an embodiment of the disclosure, and as shown in FIG. 12, the calling user may select a called number to proceed a call according to the contents displayed by the VoIP client.

Step S908, after receiving the called number and rate sent by the VoIP client, the call controller sends the selected called number and rate to the application server and charging server, and restores call processing, and proceeds the call between the VoIP client and a called terminal corresponding to a called number which is corresponding to a selected rate option.

Figure 13:
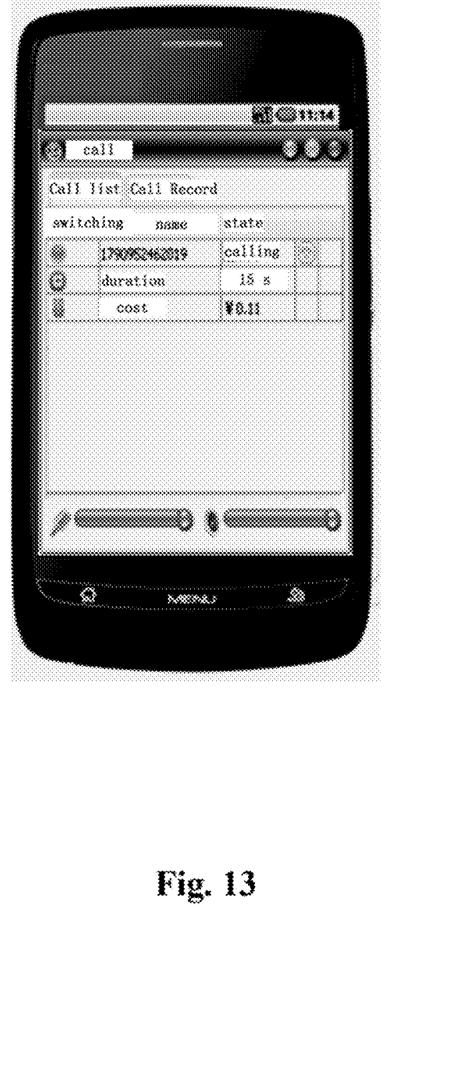
FIG. 13 is a display instantiation image after a user selects a called number and performs a conversation in an embodiment of the disclosure.

FIG. 13 is a display instantiation image after a user selecting a called number and performing a conversation in an embodiment of the disclosure, and as shown in FIG. 13, the VoIP client may display real-time cost and final cost of a current call.

In the embodiment of the disclosure, after the VoIP client initiates a multimedia call service, the call controller acquires rate information of all called numbers which are available for the VoIP client to call a called party from the application server and charging server, and returns the acquired rate information to the VoIP client. After the VoIP client receives the rate information, a user selects an appropriate rate option according to the requirement on rate, and the call controller proceeds the call between the VoIP client and a called terminal corresponding to a called number which is corresponding to a selected rate option. Therefore, the VoIP client may know rate information about a conversation before performing a call, and may select appropriate rate information according to rate information of all called numbers, thereby satisfying a user's requirements on the rate and improving user experience.

Figure 14:
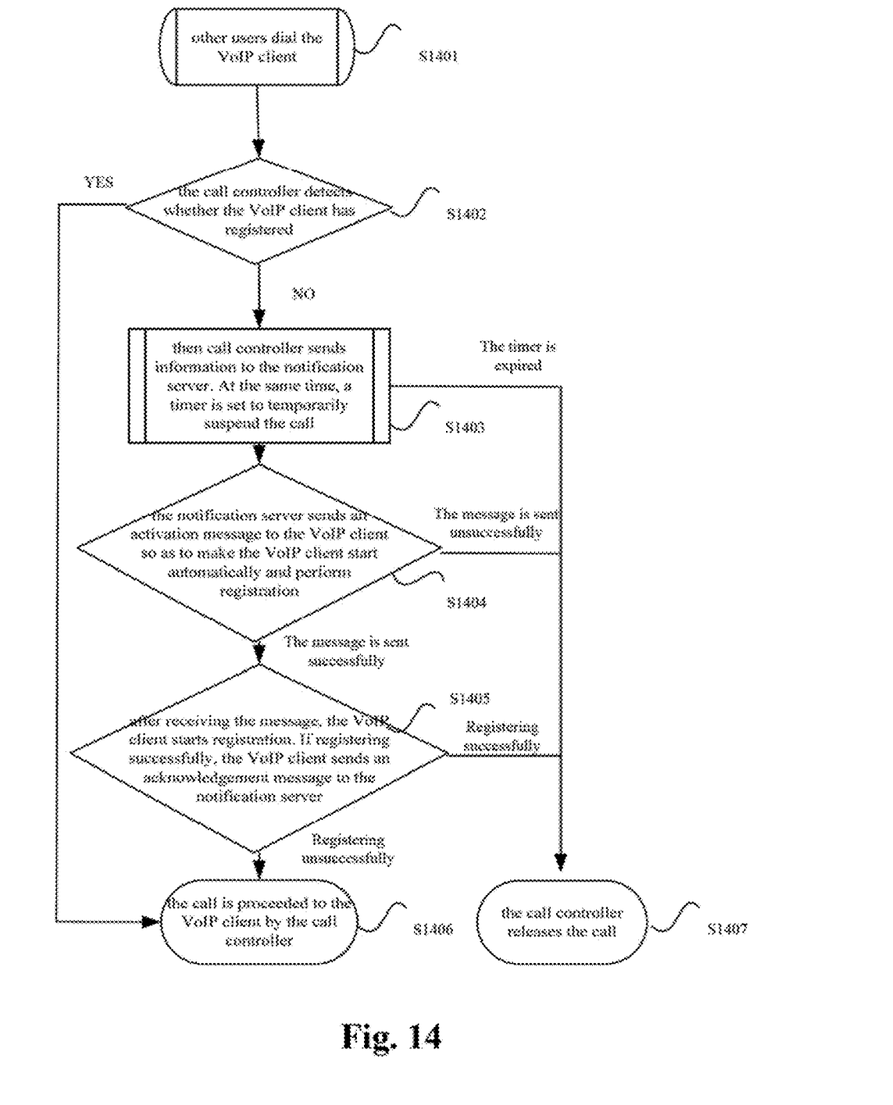
FIG. 14 is a call flow chart of a VoIP client serving as a called party without registration according to another preferred embodiment of the disclosure.

FIG. 14 is a call flow chart of a VoIP client serving as a called party without registration according to another preferred embodiment of the disclosure, and as shown in FIG. 14, the method comprises the following steps (step S1401-step S1407).

Step S1401, other users dial the VoIP client, and the call is routed to a call controller where the VoIP client is located.

Step S1402, the call controller detects a state of the VoIP client. If the VoIP client has registered, the call controller directly connects the call to the VoIP client; and if the VoIP client has not registered, the call is then routed to a notification server by the call controller.

Step S1403, since the called VoIP client has not registered, then call controller sends information to the notification server. At the same time, a timer is set to temporarily suspend a call. If the timer times out, and the call controller has not received an acknowledgement message, then the call controller releases the call.

Step S1404, the notification server sends an activation message to the VoIP client so as to make the VoIP client start automatically and perform registration. If the notification server successfully sends the message, then an acknowledgement message is fed back after waiting the VoIP client registered; and if the notification server fails to send the message, then the notification server feeds back failure information to the call controller, and the call controller releases the call.

Step S1405, after receiving the message, the VoIP client starts registration. If the VoIP client performs registration successfully, then the VoIP client sends an acknowledgement message of successful registration to the notification server, and the notification server sends the acknowledgement message of successful registration to the call controller, and the call is proceeded to the VoIP client by the call controller; and if the VoIP client does not register successfully, then the VoIP client sends a message of failed registration to the notification server and call controller, and the call controller releases the call.

Step S1406, the call is proceeded to the VoIP client by the call controller.

Step S1407, the call controller releases the call.

In the preferred embodiment, when other users dial the VoIP client, even if the VoIP client is not registered, the VoIP client may also be triggered through the flow to initiate registration automatically, and the call may be connected to the VoIP client in a greatest extent.

From the description above, it can be seen that the VoIP client, which is run on a smart phone, PC machine or other medium provided by at least one embodiment of the disclosure, is not only easy for a client to use but also supports functions, such as account registration, rate display and conversation cost real-time display. The problem that a client cannot learn or select a call and called rate before a conversation is connected is solved. In addition, when the VoIP client performs a call, the application server acquires rate information about the VoIP client calling all the called numbers of a called terminal, and sends the rate information to the VoIP client before connecting to the called terminal. After the VoIP client receives rate information about all the called numbers of the present call, and an appropriate rate option is selected according to the rate information, the call controller connects the call between the VoIP client and a called terminal corresponding to a called number which is corresponding to a selected rate option. Therefore a user may know rate information about a call before the call, and user's requirements on the rate and user experience of a multimedia call are improved.

Apparently, those skilled in the art shall understand that the above modules and steps of the disclosure can be realized by using general purpose calculating device, can be integrated in one calculating device or distributed on a network which consists of a plurality of calculating devices, and alternatively they can be realized by using the executable program code of the calculating device, so that consequently they can be stored in the storing device and performed by the calculating device, in some cases, can perform the shown or described step in sequence other than herein, or they are made into integrated circuit module respectively, or a plurality of modules or steps thereof are made into one integrated circuit module. In this way, the disclosure is not restricted to any particular hardware and software combination.

The above description is only preferred embodiments of the disclosure and is not intended to limit the disclosure, and the disclosure can have a variety of changes and modifications for ordinary person skilled in the field. Any modification, equivalent replacement, or improvement made within the spirit and principle of the disclosure shall all fall within the protection scope of the disclosure.

What is claimed is:

1. A voice over IP (VoIP) client, comprising:
   an access module, configured to make, through a preset high-speed wireless network, the VoIP client access an Internet;
   a sending module, configured to send a call request to a call controller;
   a receiving module, configured to receive at least one called number and a rate for calling each of the at least one called number that are returned by a call controller, wherein the at least one called number comprises: one or more numbers registered by and/or bound to the called party corresponding to the call request;
   a selection module, configured to select one from the at least one called number as a called number of the current call according to the at least one called number and the rate for calling each of the at least one called number, and
   an execution module, configured to perform a call proceeding by using the selected called number.

2. The VoIP client according to claim 1, wherein
   the VoIP client further comprises: a display module, configured to display the at least one called number and the rate for calling each of the at least one called number; and
   the selection module is further configured to take a called number selected by a user as the called number of the current call in response to a user selection from the at least one displayed called number.

3. The VoIP client according to claim 2, wherein
   the VoIP client further comprises: a charging module, configured to calculate a real-time cost of a current conversation and a final conversation cost after the current conversation is finished according to a duration of the current conversation and a rate corresponding to the called number selected by the selection module; and
   the display module is further configured to display the real-time cost of the current conversation and the final conversation cost after the current conversation is finished.

4. The VoIP client according to claim 1, wherein the VoIP client further comprises:
   a reporting module, configured to report a media stream report of the present conversation to the call controller after the current conversation with the called party is finished.

5. The VoIP client according to claim 1, wherein the VoIP client further comprises:

a registration module, configured to register the VoIP client to the call controller and an application server through the Internet.

6. The VoIP client according to claim 1, wherein the VoIP client further comprises:
   a detection module, configured to detect whether there is a stable signal of the preset high-speed wireless network or not currently, and if not, then trigger a prompt module; and
   the prompt module, configured to give a prompt of not suggesting to run the VoIP client.

7. The VoIP client according to claim 6, wherein the execution module is further configured to stop running the VoIP client in the case where the detection module detects that there is no signal of the preset high-speed wireless network currently or the access module cannot access the Internet.

8. The VoIP client according to claim 1, wherein the preset high-speed wireless network comprises one of the following: wireless fidelity (WiFi), unlicensed mobile access (UMA), worldwide interoperability for microwave access (WiMAX), long term evolution (LTE), and advanced LTE.

9. The VoIP client according to claim 1, wherein
   the receiving module is further configured to receive an activation message, which is for indicating to start the VoIP client if the VoIP is on-line and not registered; and
   the VoIP client further comprises: a starting module, configured to start the VoIP client when receiving the activation message, and register the VoIP client to the call controller and an application server.

10. The VoIP client according to claim 9, wherein the receiving module is further configured to receive a call request from the call controller after the starting module successfully registers the VoIP client to the call controller and the application server, wherein a called party corresponding to the call request is the VoIP client.

11. The VoIP client according to claim 9, wherein the activation message is sent to the VoIP client by a notification server in the case where the VoIP client serves as a called party, the call controller determines that the VoIP client is not registered and a notification is sent to the notification server.

12. A user terminal, comprising a VoIP client as claimed in claim 1.

13. A call implementation method for a voice over IP (VoIP) client, comprising:
   a VoIP client sending a call request to a call controller after accessing an Internet through a preset high-speed wireless network;
   the VoIP client receiving at least one called number and a rate for calling each of the at least one called number that are returned by the call controller, wherein the at least one called number comprises: one or more numbers registered by and/or bound to the called party corresponding to the call request;
   the VoIP client selecting one from the at least one called number as a called number of the current call according to the at least one called number and the rate for calling each of the at least one called number; and
   the VoIP client performing a call proceeding by using the selected called number.

14. The method according to claim 13, wherein
   after the VoIP client receives the rate for calling each of the at least one called number that is returned by the call controller, the method further comprises: displaying the at least one called number and the rate for calling each of the at least one called number;
   the VoIP client selecting one from the at least one called number as a called number of the current call according to the at least one called number and the rate for calling each of the at least one called number comprises: taking a called number selected by a user as the called number of the current call in response to a user selection from the at least one displayed called number; and
   the VoIP client selects one from the at least one called number as the called number of the current call according to the at least one called number and the rate for calling each of the at least one called number.

15. The method according to claim 13, wherein after the VoIP client performs the call proceeding by using the selected called number, the method further comprises:
   the VoIP client performing a conversation with a called party, and calculating a real-time cost of a current conversation and a final conversation cost after the current conversation is finished according to a duration of the current conversation and a rate corresponding to the called number selected by the selection module; and
   the VoIP client displaying the real-time cost of the current conversation and the final conversation cost after the current conversation is finished.

16. The method according to claim 13, wherein after the VoIP client performs the call proceeding by using the selected called number, the method further comprises:
   the VoIP client performing a conversation with a called party, and reporting a media stream report of the present conversation to the call controller after the current conversation with the called party is finished.

17. The method according to claim 13, wherein the method further comprises: the VoIP client detecting whether there is a stable signal of the preset high-speed wireless network or not currently, and if not, then giving a prompt of not suggesting to run the VoIP client.

18. The method according to claim 17, wherein when the VoIP client detects that there is no signal of the preset high-speed wireless network currently or the VoIP client cannot access the Internet, the method further comprises: the VoIP client stopping running.

19. The method according to claim 13, wherein the method further comprises:
   the VoIP client receiving an activation message, which is for indicating to start the VoIP client if the VoIP is on-line and not registered; and
   the VoIP client being started when the activation message is received, and registering on the call controller and an application server.

20. The method according to claim 19, wherein the activation message is sent to the VoIP client by a notification server in the case where the VoIP client serves as a called party, the call controller determines that the VoIP client is not registered and a notification is sent to the notification server.

* * * * *